United States Patent
Zheng et al.

(10) Patent No.: US 10,917,743 B2
(45) Date of Patent: *Feb. 9, 2021

(54) MAPPING DISCOVERY SYSTEM

(71) Applicant: Snap Inc., Santa Monica, CA (US)

(72) Inventors: Lillian Zheng, Los Angeles, CA (US); Ashley Michelle Wayne, Los Angeles, CA (US); Leonid Gorkin, Chappaqua, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,739

(22) Filed: Aug. 26, 2020

(65) Prior Publication Data

US 2020/0396561 A1 Dec. 17, 2020

Related U.S. Application Data

(63) Continuation of application No. 16/654,755, filed on Oct. 16, 2019, now Pat. No. 10,791,422, which is a
(Continued)

(51) Int. Cl.
*H04W 24/00* (2009.01)
*H04W 4/021* (2018.01)
(Continued)

(52) U.S. Cl.
CPC .......... *H04W 4/021* (2013.01); *H04W 4/029* (2018.02); *H04W 4/14* (2013.01); *H04W 4/30* (2018.02)

(58) Field of Classification Search
CPC ......... H04W 4/02; H04W 4/14; H04W 48/04; H04W 64/00
(Continued)

(56) References Cited

U.S. PATENT DOCUMENTS 9,866,999 B1 1/2018 Noeth
10,547,970 B1 1/2020 Zheng et al.
(Continued)

FOREIGN PATENT DOCUMENTS

WO WO-2020131703 A1 6/2020

OTHER PUBLICATIONS

U.S. Appl. No. 16/226,063 U.S. Pat. No. 10,547,970, filed Dec. 19, 2018, Mapping Discovery System.
(Continued)

*Primary Examiner* — Matthew W Genack
(74) *Attorney, Agent, or Firm* — Schwegman Lundberg & Woessner, P.A.

(57) ABSTRACT

Systems and methods are provided for determining that the first computing device is located within a predetermined geofence and that a user of the first computing device is opted into chance mode. Based on determining that the user of first computing device is opted into chance mode, systems and methods further provide for determining a subset of a plurality of computing devices that are located within the predetermined geofence and that are associated with users opted into chance mode, generating location information and user information each of the users of the subset of the plurality of computing devices, and causing display on the first computing device of indicium for each user associated with each of the subset of the plurality of computing devices on a map, each indicium presented in a location on the map associated with each of the subset of the plurality of computing devices.

20 Claims, 15 Drawing Sheets

Related U.S. Application Data continuation of application No. 16/226,063, filed on Dec. 19, 2018, now Pat. No. 10,547,970.

(51) Int. Cl.
*H04W 4/14* (2009.01)
*H04W 4/029* (2018.01)
*H04W 4/30* (2018.01)

(58) Field of Classification Search
USPC .................. 455/456.1–456.6, 457, 466
See application file for complete search history.

(56) References Cited

U.S. PATENT DOCUMENTS

| | | | |
|---|---|---|---|
| 10,791,422 | B2 | 9/2020 | Zheng et al. |
| 2007/0022163 | A1 | 1/2007 | Wormald et al. |
| 2010/0123724 | A1 | 5/2010 | Moore et al. |
| 2011/0142016 | A1 | 6/2011 | Chatterjee |
| 2012/0270559 | A1 | 10/2012 | Ingerson |
| 2013/0059606 | A1 | 3/2013 | Pujol et al. |
| 2013/0151609 | A1 | 6/2013 | Rubinstein et al. |
| 2015/0289100 | A1 | 10/2015 | Stringer, II |
| 2017/0026460 | A1 | 1/2017 | Patel |
| 2017/0326944 | A1 | 11/2017 | Carlesimo et al. |
| 2018/0314707 | A1 | 11/2018 | Nguyen |
| 2018/0356961 | A1 | 12/2018 | Lewis et al. |
| 2020/0204943 | A1 | 6/2020 | Zheng et al. |

OTHER PUBLICATIONS

U.S. Appl. No. 16/654,755, filed Oct. 16, 2019, Mapping Discovery System.

"U.S. Appl. No. 16/226,063, Notice of Allowance dated Apr. 4, 2019", 27 pgs.

"U.S. Appl. No. 16/226,063, Notice of Allowance dated Jul. 17, 2019", 15 pgs.

"U.S. Appl. No. 16/226,063, Response filed Jun. 25, 2019 to Non-Final Office Action dated Apr. 4, 2019", 16 pgs.

"U.S. Appl. No. 16/654,755, Final Office Action dated Mar. 16, 2020".

"U.S. Appl. No. 16/654,755, Non Final Office Action dated Nov. 12, 2019", 40 pgs.

"U.S. Appl. No. 16/654,755, Notice of Allowance dated May 28, 2020", 16 pgs.

"U.S. Appl. No. 16/654,755, Response filed May 15, 2020 to Final Office Action dated Mar. 16, 2020", 16.

"International Application Serial No. PCT/US2019/066552, International Search Report dated Feb. 27, 2020", 5 pgs.

"International Application Serial No. PCT/US2019/066552, Written Opinion dated Feb. 27, 2020", 6 pgs.

MAPPING DISCOVERY SYSTEM

CLAIM OF PRIORITY

This application is a continuation of and claims the benefit of priority of U.S. patent application Ser. No. 16/654,755, filed on Oct. 16, 2019, which is a continuation of and claims the benefit of priority of U.S. patent application Ser. No. 16/226,063, filed on Dec. 19, 2018, each which is hereby incorporated by reference herein in their entireties.

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth. Often, a user sends messages to users in his or her social network and can view profile data for users only in his or her social network.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a mapping discovery system. One issue in today's social environment is that it is difficult to meet people in an organic way, whether it is for business, romance, or friendship, due to factors such as lack of clarity of whether another person is open to meeting new people or the "work" of trying to network for new business or meet someone for a romantic or friendship connection. Moreover, with content sharing platforms, a user can typically only send messages to users in his or her social network and can only view profile or location data for users in his or her social network. Example embodiments allow users to connect in a new way by allowing users to opt into a chance mode for discovering and meeting other users. In this mode, example embodiments allow a user to discover new people in real life in particular social places (e.g., geolocations), with common interests, and the like.

In example embodiments, a server system receives location data associated with a first computing device and determines that the first computing device is located within a predetermined geofence (e.g., a chance mode geofence) based on the received location data associated with the first computing device. The server system determines whether a user of the first computing device is opted into a chance mode. If the user of the first computing device is not opted into a chance mode, the first computing device prompts a user to enable or opt into chance mode. Based on determining that the user of the first computing device is opted into chance mode, the server system determines a subset of a plurality of computing devices that are located within the predetermined geofence and are associated with users opted into chance mode. The server system then generates location information and user information for each of the subset of the plurality of the computing devices. The server system may then provide this information to the first computing device to cause display on the first computing device of an indicium for each user associated with each of the subset of the plurality of computing devices on a map. In one example, each indicium presented is in a location on the map associated with each of the subset of the plurality of computing devices. The user of the first computing device may then send a notification message to initiate a chat with a second user represented on the map. If the second user responds to the notification message, the users can chat and meet in person. In one example, the chat is limited to a specified time period (e.g., 30 minutes) after which it is deleted from both computing devices.

Figure 1:
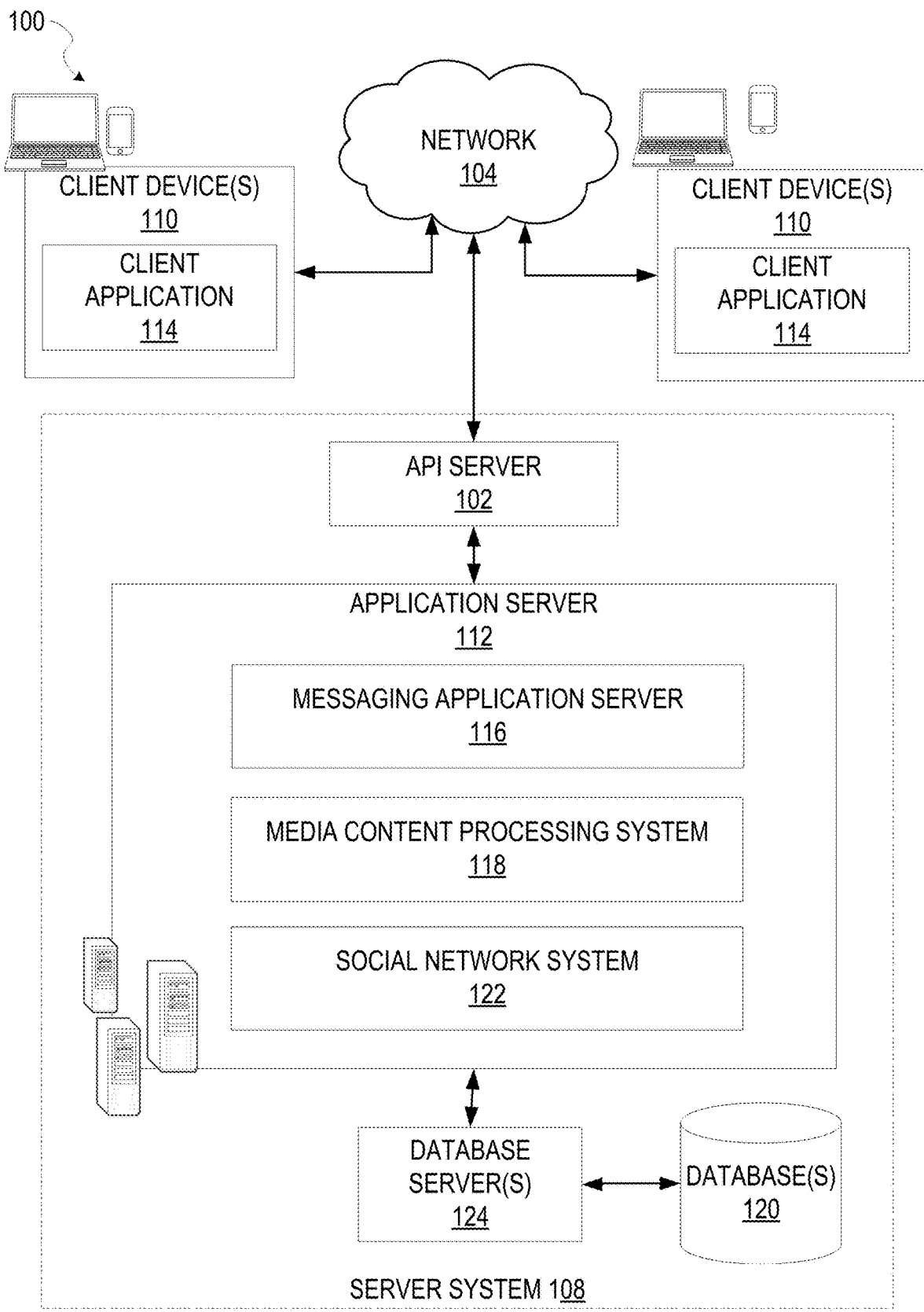
FIG. 1 is a block diagram showing an example networked system for exchanging data (e.g., messages and associated content) over a network, according to some example embodiments.

FIG. 1 is a block diagram illustrating a networked system 100 (e.g., a content sharing platform or messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays, view and generate interactive messages, view other users on a map, and so forth.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third-party servers, the server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer@ browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide a user interface and at least some of the functionalities of the application, with the client application 114 configured to communicate with other entities in the system 100 (e.g., third-party servers, the server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, the server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched or joined together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

In another example, the messaging application may allow a user to view other users on a map. For example, the user may view friends or other users in his or her social network, or may opt into a "chance mode" that allows the user to view other users open to meeting new people (e.g., for business, romance, or friendship). The messaging application may further allow a user to send messages to the other users, and the messages may be temporary or limited to a specified time period after which they are deleted.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, and a social network system 122, which may be communicatively coupled with each other and with one or more data storages, such as one or more databases 120.

The server system 108 may be a cloud computing environment, according to some example embodiments. The server system 108, and any servers associated with the server system 108, may be associated with a cloud-based application, in one example embodiment.

The one or more databases 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., a computing or client device 110), media overlays, media overlay smart widgets or smart elements, user data, user device information, media content (e.g., video and images), media content data (e.g., data associated with video and images), computing device context data, serialized data, session data items, user device location data, mapping information, chance mode data, interactive message usage data, interactive message metrics data, and so forth. The one or more databases 120 may further store information related to third-party servers, third-party applications, client devices 110, client applications 114, users, and so forth.

The one or more databases 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party applications. The one or more third-party applications, executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed either by a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), interactive message usage data, and chance mode data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more databases 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); mapping data; and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., the database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database(s) 120. Examples of functions and services supported by the social network system 122 include the identification of other users of the networked system 100 with whom a particular user has relationships or whom the particular user is "following," and also the identification of other entities and interests of a particular user. The social network system 122 also maintains chance mode geofences and indexes of user locations related to chance mode.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
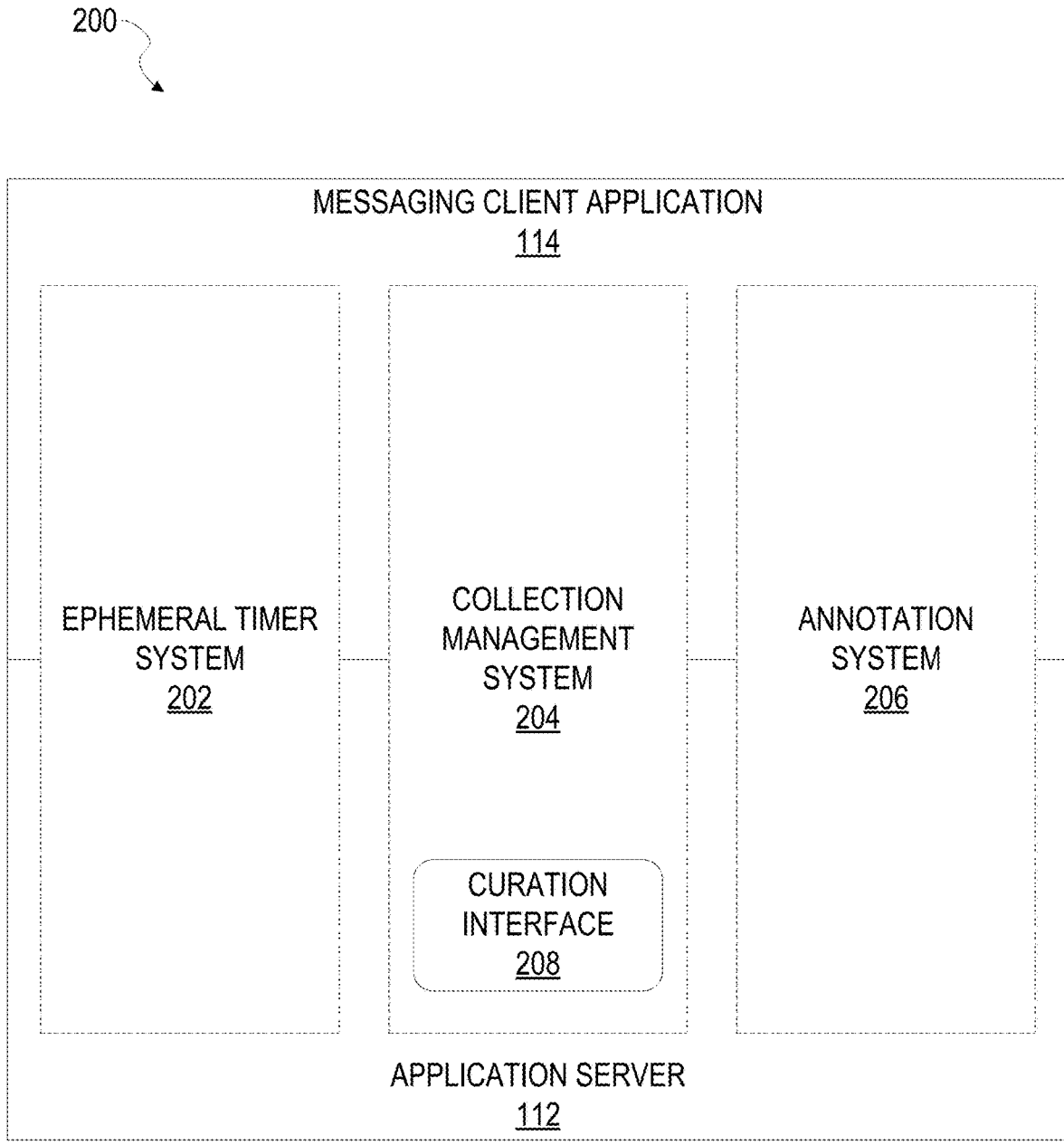
FIG. 2 is a block diagram illustrating further details regarding the messaging system, according to some example embodiments.

FIG. 2 is a block diagram 200 illustrating further details regarding the system 100, according to example embodiments. Specifically, the system 200 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, a collection of messages (e.g., otherwise referred to herein as "media collections," "galleries," "message collections," "stories," and the like), or a chat in chance mode, selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database(s) 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
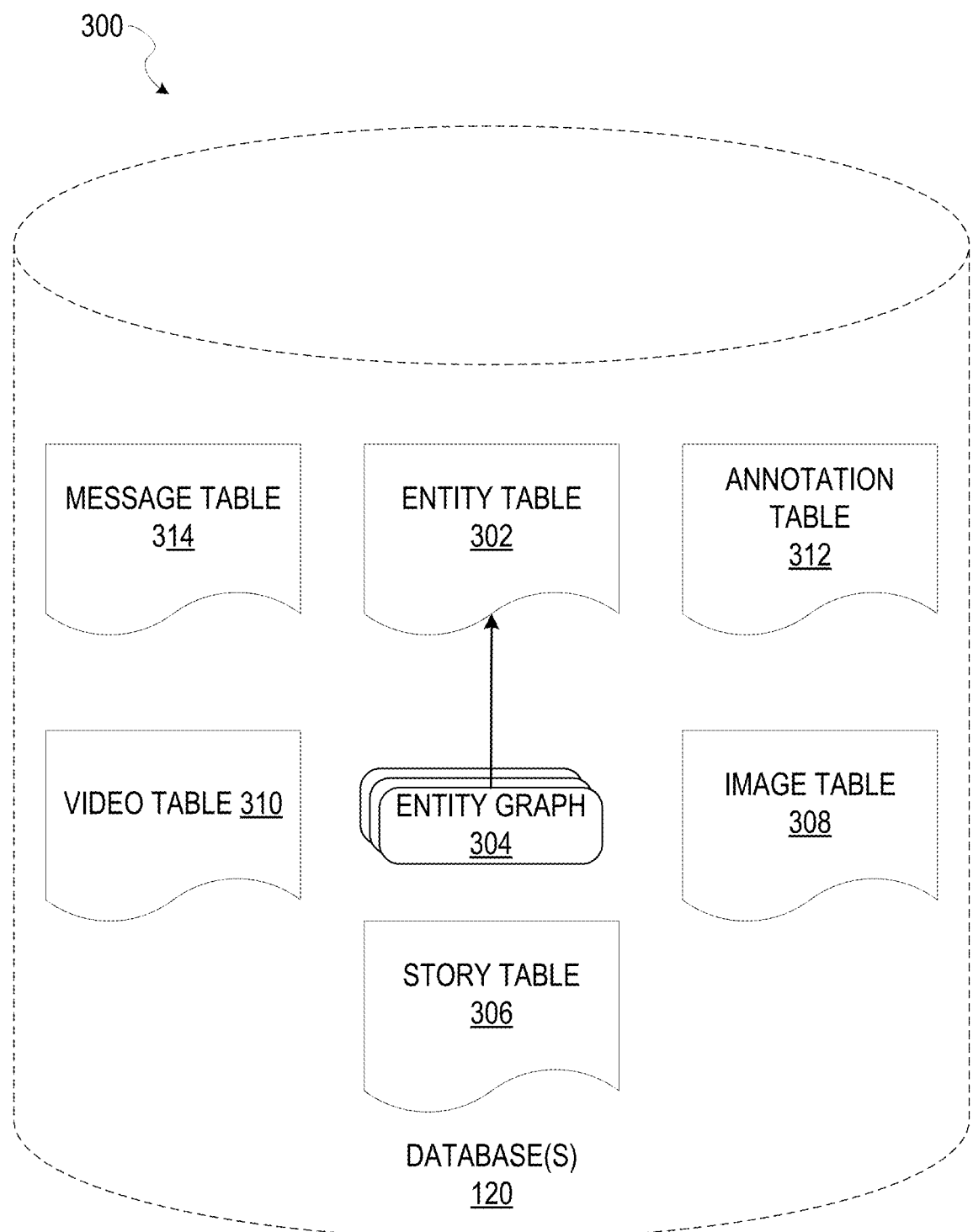
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database(s) 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as "geo-filters"), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
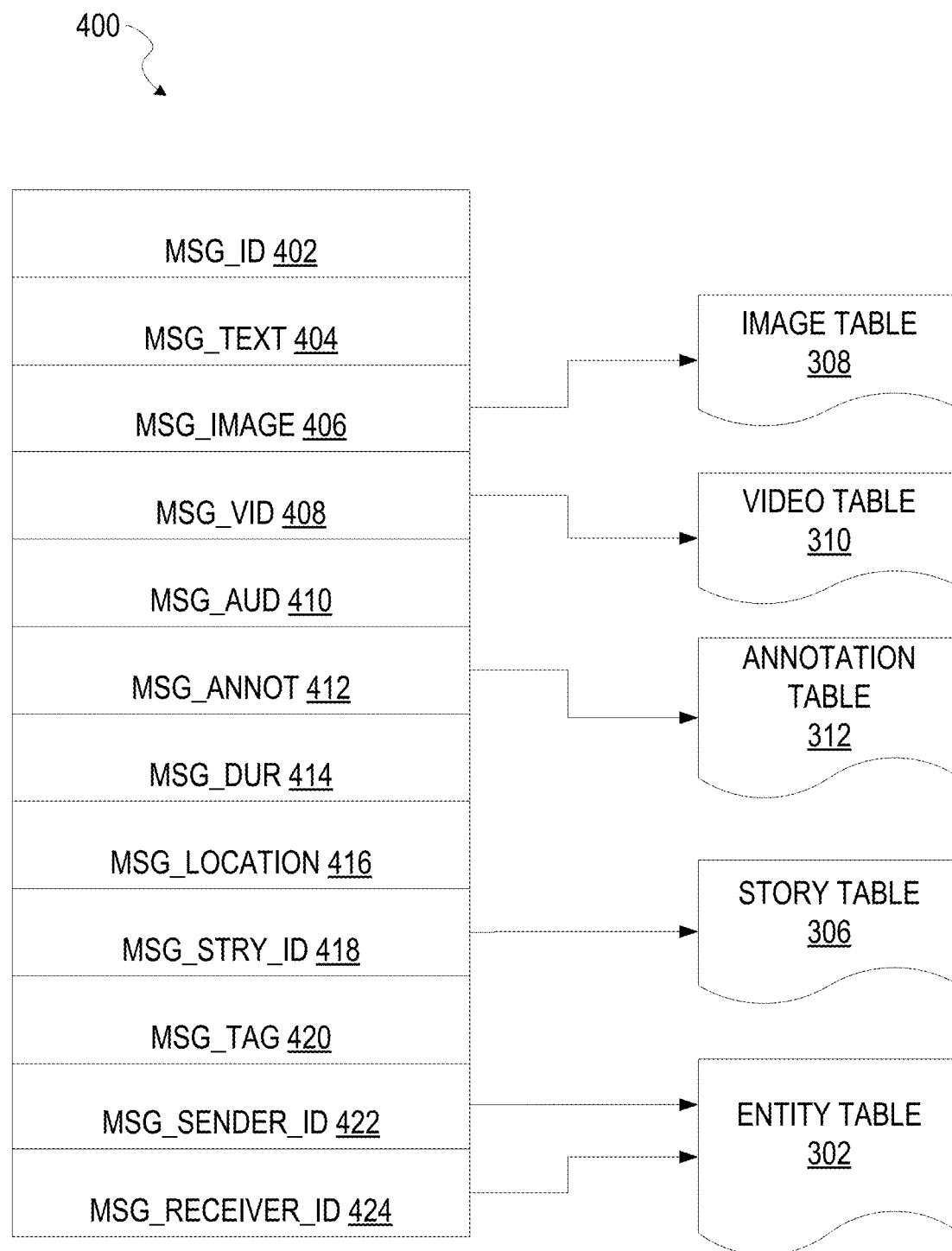
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database(s) 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
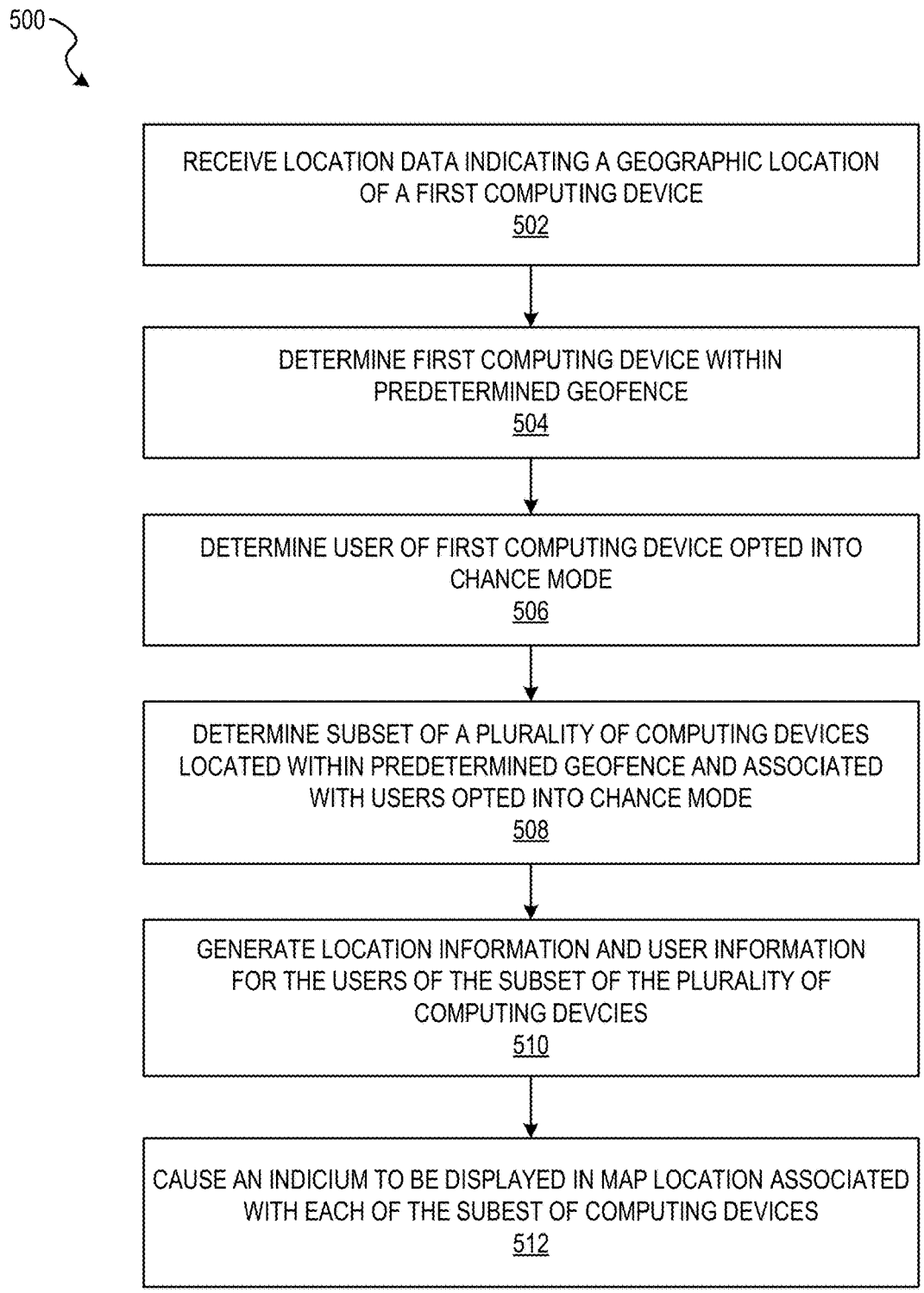
FIG. 5 is a flow chart illustrating aspects of a method, according to some example embodiments.

FIG. 5 is a flow chart illustrating aspects of a method 500, for a mapping discovery system, according to some example embodiments. For illustrative purposes, the method 500 is described with respect to the networked system 100 of FIG. 1. It is to be understood that the method 500 may be practiced with other system configurations in other embodiments.

In one example, a server system (e.g., the server system 108) receives location data from a plurality of computing devices (e.g., client devices 110). For example, the server system may receive location data for each computing device currently running a messaging or content sharing application (e.g., the client application 114). Location data may comprise data based on Global Positioning System (GPS) or other technology utilized by the computing device. The location data may comprise latitude and longitude coordinates, an address, a name of a location (e.g., a restaurant name, a bar name, a business name), an intersection, or another form of location data indicating a location of the computing device. The server system may automatically receive location data from the computing device or may specifically request the location data from the computing device. The location data may be received periodically or on a regular basis (e.g., every few seconds). For example, each computing device of the plurality of computing devices may detect location information (e.g., via GPS or other technology) and send the location information to the server system periodically or on a regular basis.

In one example, the server system stores the location data for each of the plurality of computing devices. For example, the server system stores the location data in one or more databases 120. As mentioned above, the server system may periodically or regularly receive location data from each of the plurality of computing devices, and storing the location data may comprise replacing the existing location data with new location data received from each of the plurality of computing devices. In this way the server system has access to the most up-to-date location information for each of the plurality of computing devices.

In operation 502, the server system receives location data associated with a first computing device. The server system may receive the location data from the first computing device, as explained above. The location data indicates a geographic location of the first computing device.

In operation 504, the server system determines whether the first computing device is located within a predetermined geofence based on the received location data associated with the first computing device. For example, the server system may access a data store (e.g., one or more databases 120) to determine whether the location of the first computing device is within a chance mode geofence. A chance mode geofence is a predetermined geofence associated with a location for meeting new people (e.g., other users) located within a geofence. For example, an administrator or another user may set up a geofence (e.g., a virtual geographic boundary around an area) for a single location (e.g., bar, restaurant, event), for multiple locations (e.g., an area comprising several bars or restaurants), based on location categories, and so forth.

Figure 6:
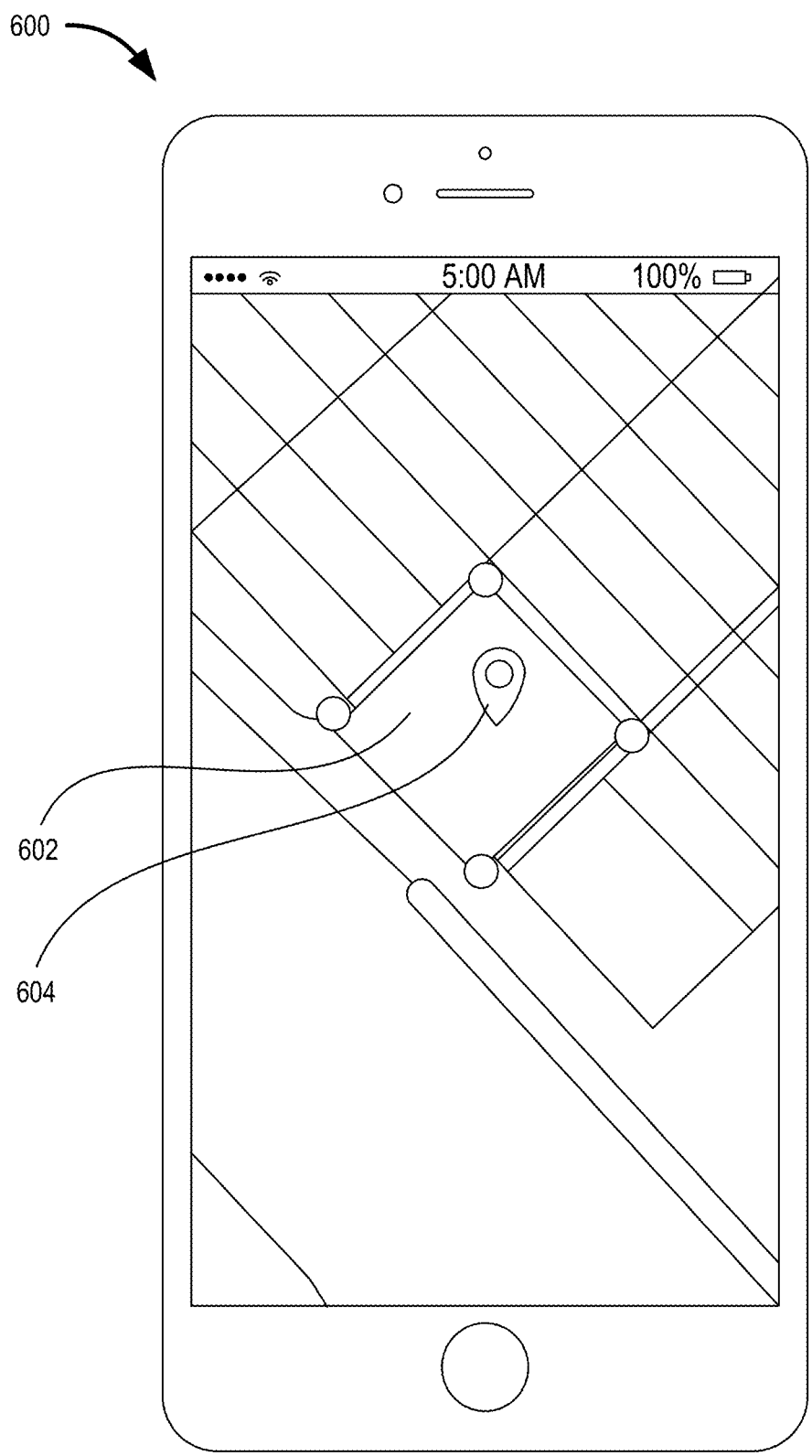
FIGS. 6-13 illustrate example graphical user interfaces, according to some example embodiments.

FIG. 6 illustrates an example display 600 of a geofence 602 for a single location 604 (e.g., a bar or restaurant). For example, a bar or a restaurant can sponsor a chance mode event where users can come to the bar or restaurant during a specified time period (e.g., between 10:00 pm and 2:00 am) to meet other users. In another example, a user can set up a geofence for a particular bar or restaurant for a particular time period. These geofences and optional specified time periods can be stored in the data store.

Figure 7:
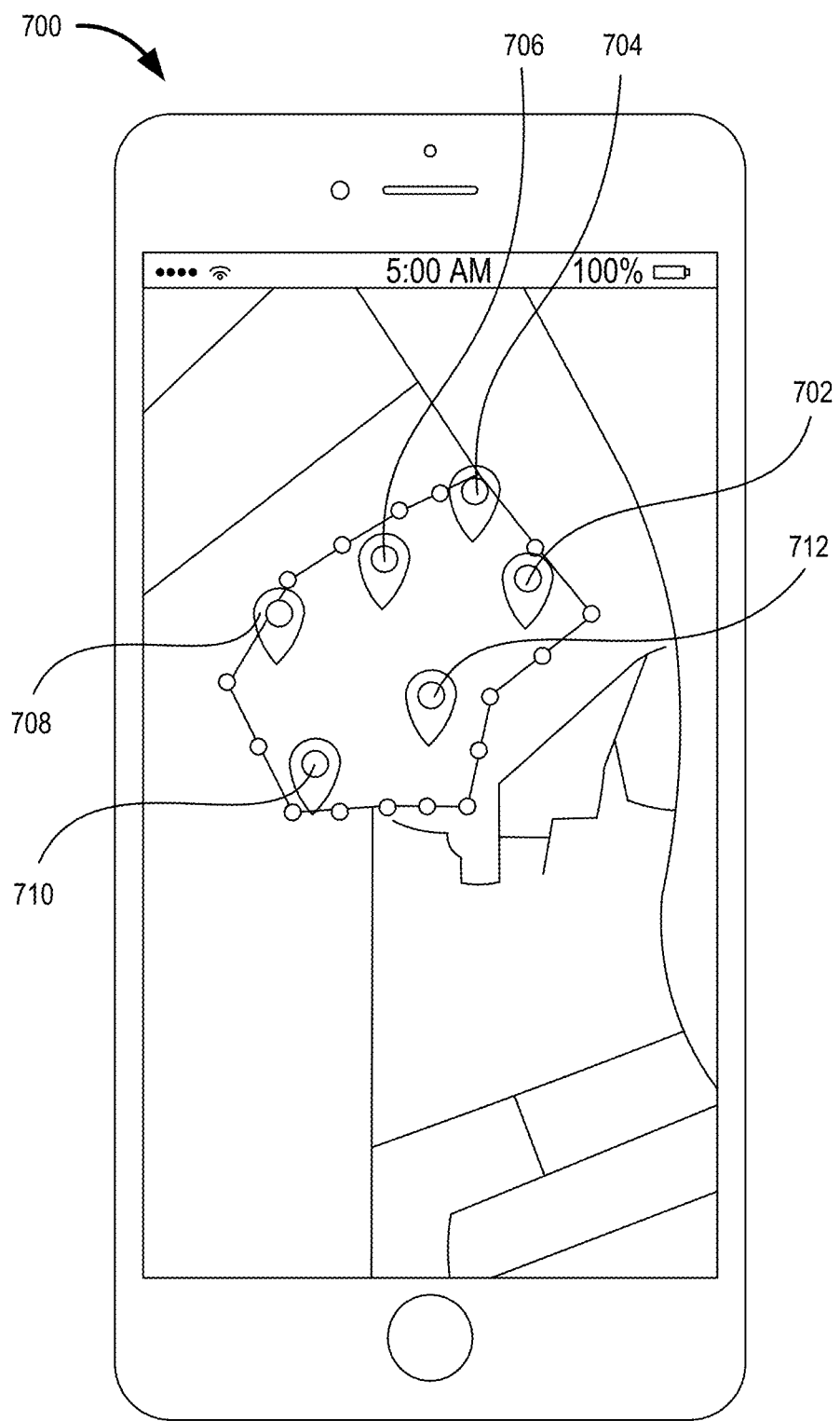

FIG. 7 illustrates an example display 700 of a geofence 702 that includes multiple locations 704-714. For example, an administrator or user can fence multiple locations (e.g., bars and restaurants). For example, multiple bars in the area can advertise that chance mode is enabled from 9:00 pm to 12:00 am. These geofences and optional specified time periods can be stored in the data store.

If the first computing device is not within a predetermined geofence, the method 500 ends. If the server system determines that the first computing device is within a predetermined geofence (e.g., is within a chance mode geofence), as shown in operation 504 of FIG. 5, the server system determines whether a user associated with the first computing device is opted into chance mode, as shown in operation 506. For example, the server system may access one or more databases 120 to look up whether a user associated with the first computing device is opted into chance mode.

Figure 8:
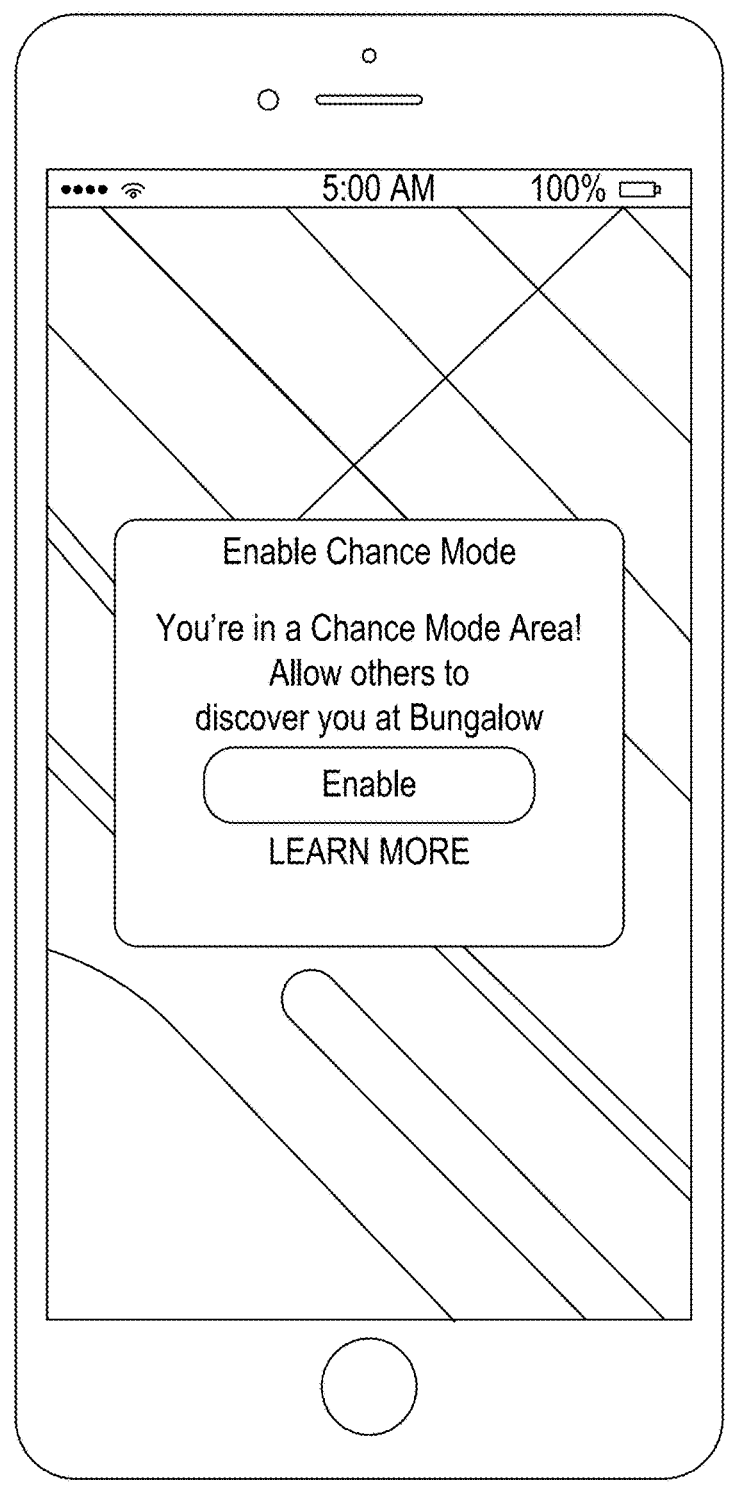

If the server system determines that the user is not opted into chance mode (e.g., the user is not in the list of users opted into chance mode), the server system can cause display of an option to opt into chance mode on the first computing device. For example, the server system can send information to the first computing device indicating that the user is not opted into chance mode and requesting that the user enable chance mode. The first computing device receives the information indicating that the user is not opted into chance mode and requesting that the user enable chance mode. The computing device can then request that the user enable chance mode. FIG. 8 illustrates an example display 800 on the first computing device alerting the user to the fact that he is in a chance mode area and asking the user whether he would like to enable chance mode (e.g., opt in) or learn more.

If the first computing device receives an indication that the user would like to enable (e.g., opt into) chance mode (e.g., via a user interaction with the display to indicate a desire to enable or opt into chance mode), the first computing device allows the user to set up a user profile for chance mode. The user profile comprises information associated with the user that can be used to determine other users who can see the user in chance mode and information that can be shared with other users in chance mode. In one example, the profile information includes a few of the last messages or media items (e.g., images or video) that the user posted or shared via the messaging system or content sharing platform (e.g., a specified number of messages generated in the content sharing platform or messaging system), a one-line statement describing the user and what he is seeking, and selected age groups and genders for other users who can see the user in chance mode. It is to be understood that more, less, or other information may be included in a user profile (also referred to herein at "chance mode profile"). In one example, the last messages generated in the content sharing platform or messaging system are automatically displayed in the user chance mode profile. In one example, the user is given the option to choose different or additional messages to include in the chance mode profile.

Figure 9:
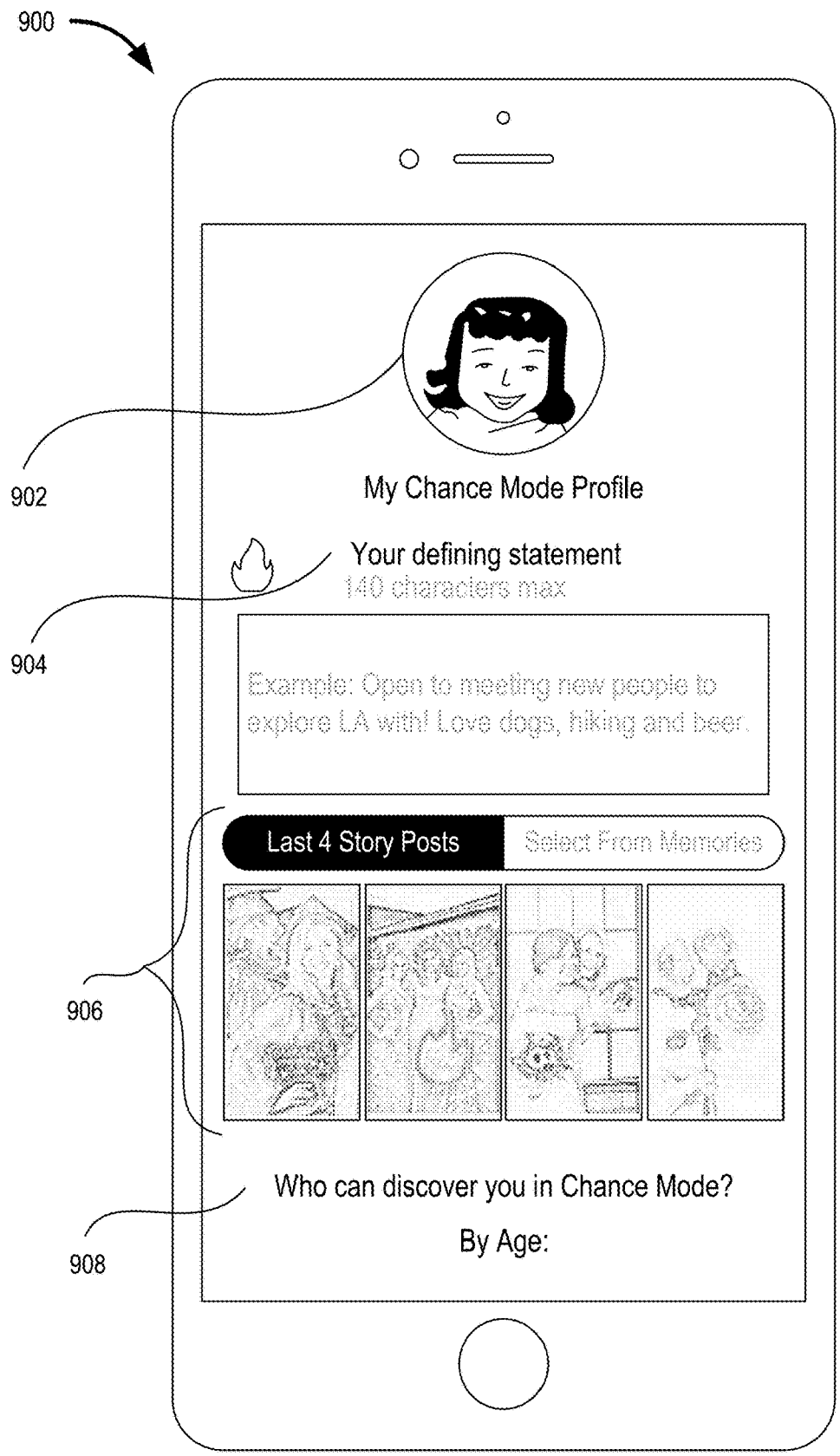

FIG. 9 illustrates an example display 900 for setting up a chance mode profile. In this example, the display 900 allows a user to input a personal emoji or bitmoji 902 (or the server system can pull an already created emoji from the messaging application or system), input a statement 904, load most recent (e.g., a specified number of) messages 906 (e.g., media content items such as images or video posted or shared in the messaging system), and specify who can discover or view the user in chance mode 908 (e.g., by age, gender, and/or other means).

Figure 10:
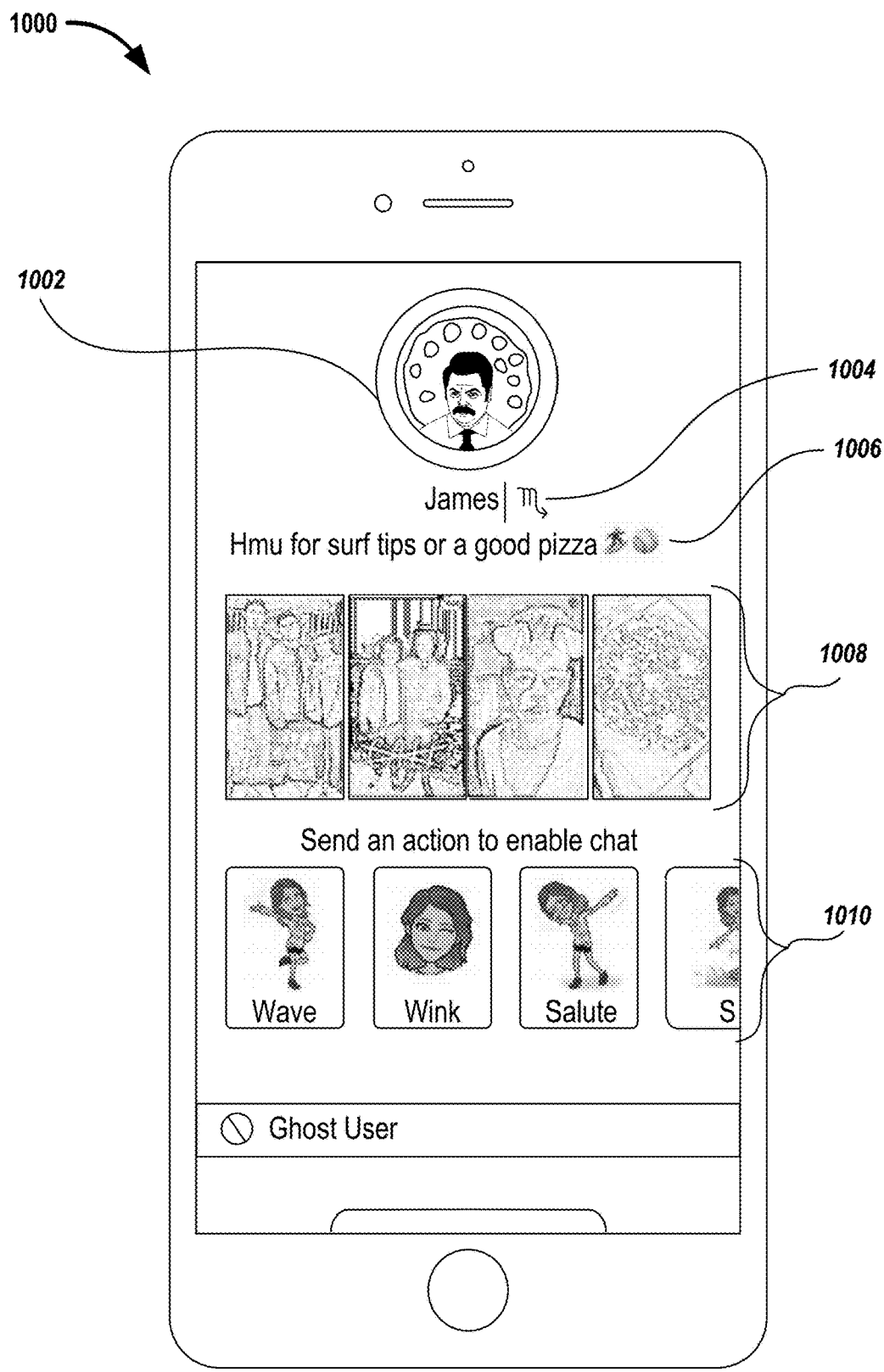

FIG. 10 illustrates an example display 1000 of a set-up user profile. In this example, the chance mode profile includes a bitmoji 1002, a user name 1004, a user statement 1006, a few messages 1008 created by the user, and a number of actions 1010 available to the user to enable a chat with another user in chance mode.

Once the user has finished entering his or her chance mode profile data, the first computing device sends the profile data to the server system. The server system receives the profile data for the user associated with the first computing device comprising the information related to chance mode, and stores the profile data in one or more data stores (e.g., databases 120). In this way, the server system can receive and store a plurality of user profiles for a plurality of users associated with a plurality of computing devices.

Returning to FIG. 5, based on the server system determining that the first computing device is opted into chance mode, the server system determines a subset of a plurality of computing devices that that are located within the predetermined geofence and that are associated with users opted into chance mode, as shown in operation 508. For example, the server system accesses one or more data stores (e.g., databases 120) to determine, based on stored location data for each of the plurality of computing devices, which computing devices are located within the predetermined geofence (e.g., chance mode geofence) that are associated with users that are opted into chance mode (e.g., by accessing a data store comprising a list of users opted into chance mode). For example, there may be many computing devices located within the predetermine geofence, but only a subset of the computing device may be associated with users that are opted into chance mode.

In one example, the server system filters the subset of the plurality of computing devices based on information in the user chance mode profile. For example, the user may have specified a certain age range and gender of who can view the user in chance mode and who the user wants to see in chance mode. The user may also specifically exclude or block certain users (e.g., an employer or ex-boyfriend, or other users who can be blacklisted for the user). The server system thus generates a final list of a subset of the plurality of computing devices excluding any users who are blacklisted or do not meet the specified criteria (e.g., age range, gender, etc.) of the user chance mode profile.

In operation 510, the server system generates location information and user information for each of the subset of the plurality of computing devices. For example, the server system accesses location data to determine the location of each of the subset of the plurality of computing devices and accesses user chance mode profile data for users associated with each of the subset of the plurality of computing devices to generate the location information and user information. The user information may comprise a bitmoji, a user statement, recently shared messages (e.g., media items such as images and video), and other information. The server system provides the location information and user information to the first computing device. In operation 512, the server system causes an indicium for each user associated with each of the subset of the plurality of computing devices to be displayed on a map. The indicium is presented in a location on the map associated with each of the subset of the plurality of computing devices.

For example, the first computing device receives the location information and user information for each of the subset of the plurality of computing devices. The first computing device generates a map comprising the location associated with the chance mode geofence and displays an indicium (e.g., bitmoji or other indicia) for each user associated with each of the subset of the plurality of computing devices in a location on the map associated with the location of each of the subset of the plurality of computing devices. In this way, a user of the first computing device can view all users opted into chance mode (e.g., open to meeting new people).

Figure 11:
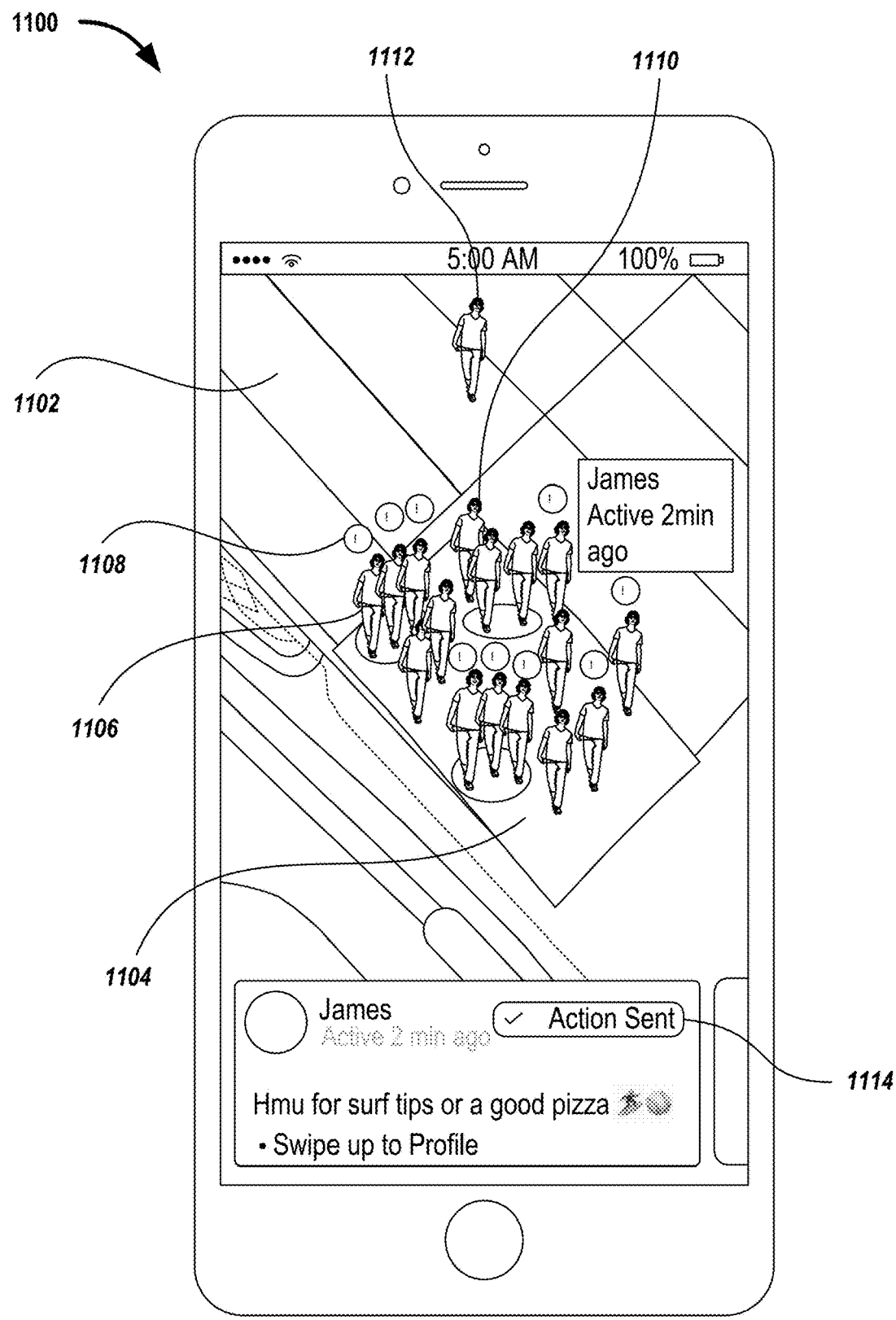

FIG. 11 illustrates a display 1100 that comprises a map 1102 comprising a location 1104 associated with a chance mode geofence. Indicia in the form of bitmojis, such as an indicium 1106, are displayed on the map 1102 in positions where the users are located in the location 1104. A second indicium 1108 may be used to indicate that the user has opted into chance mode. Optionally, other indicia 1110 without the second indicium 1108 may also be shown to indicate known users (e.g., friends, co-workers, etc.) to the user of the first computing device who are also in the location 1104 or in the surrounding area (e.g., such as an indicium 1112 for a user outside of the chance mode geofence).

In one example, the user of the first computing device may send an action to one or more other users in chance mode to engage with the one or more other users. Some examples of actions 1010 are shown in FIG. 10. For example, the user can select a wave or a wink to send a notification to a second user. In another example, a user can select a ghost action to block a user. The ghost or block action enables the user to be hidden from the blocked user either temporarily (e.g., for 24 hours or another specified time period) or permanently (e.g., so the blocked user will never see the user in any further chance mode areas). The blocked user can then be stored in the user chance mode profile.

Figure 12:
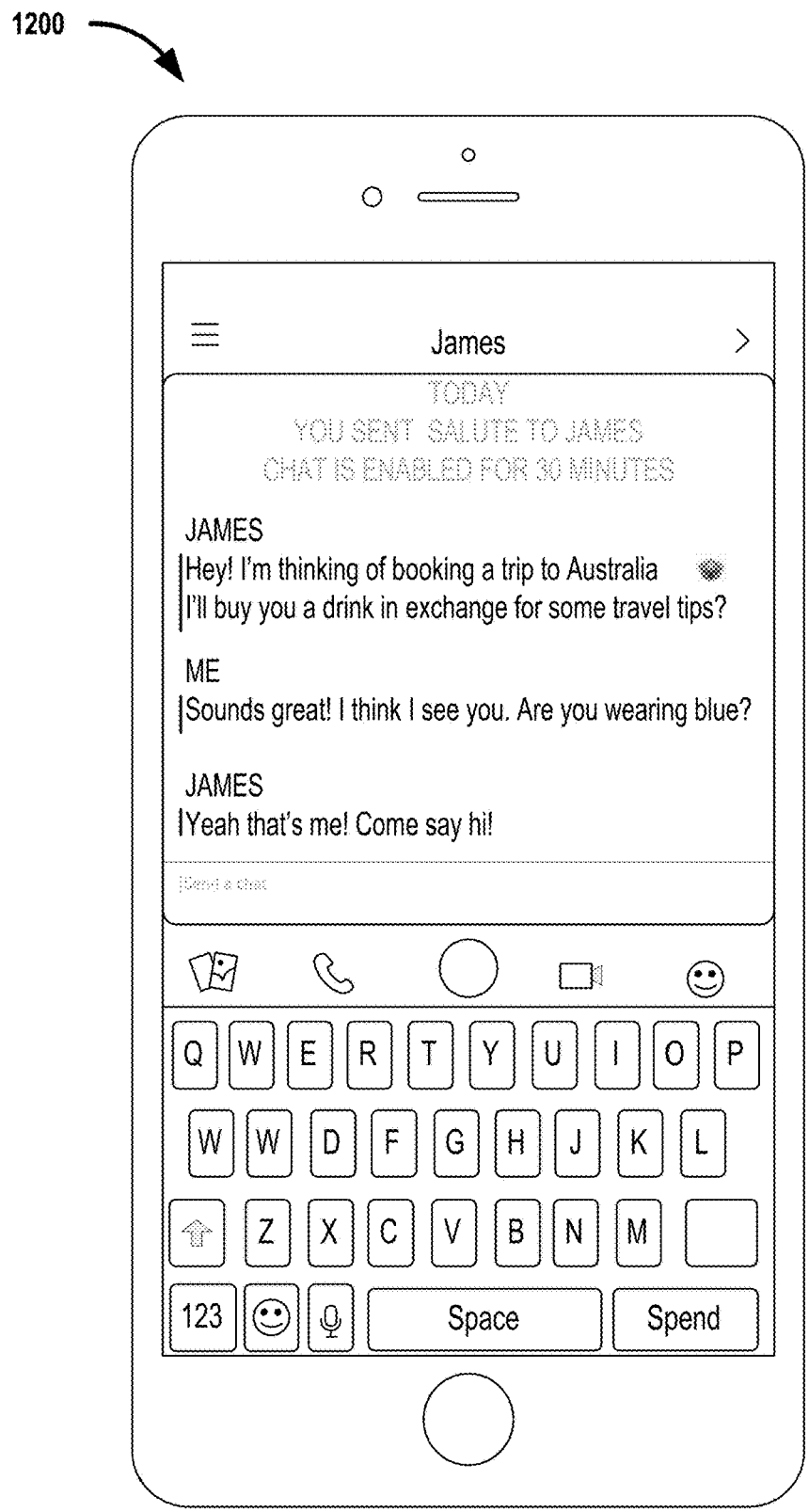

After the user selects a wave or a wink or another action to send a notification to a second user, the first computing device sends the notification to the computing device of the second user. The display 1100 may indicate via an icon or message 1114 that an action has been sent. The computing device of the second user receives the notification and displays the notification to the second user. If the second user responds to the notification, this two-way interaction establishes a chat. The user and the second user can then chat (e.g., exchange messages) and meet in person. If the second user does not respond to the notification, a chat is not established, and a connection is not made. FIG. 12 illustrates an example display 1200 showing an interaction between a user (James) and a second user (Me).

In one example, the chat is temporary. For example, the chat is only available for a specified time period (e.g., 15 minutes, 30 minutes, etc.). A timed chat encourages people to meet in person instead of just exchanging messages. In this example, once the two-way interaction is established (e.g., once the second user responds to the notification from the first user), a timer starts. Once the timer reaches the end of the specified time period (e.g., 30 minutes), the chat is deleted from the first computing device and the computing device of the second user. Thus, the messages no longer display on either of the computing devices.

Figure 13:
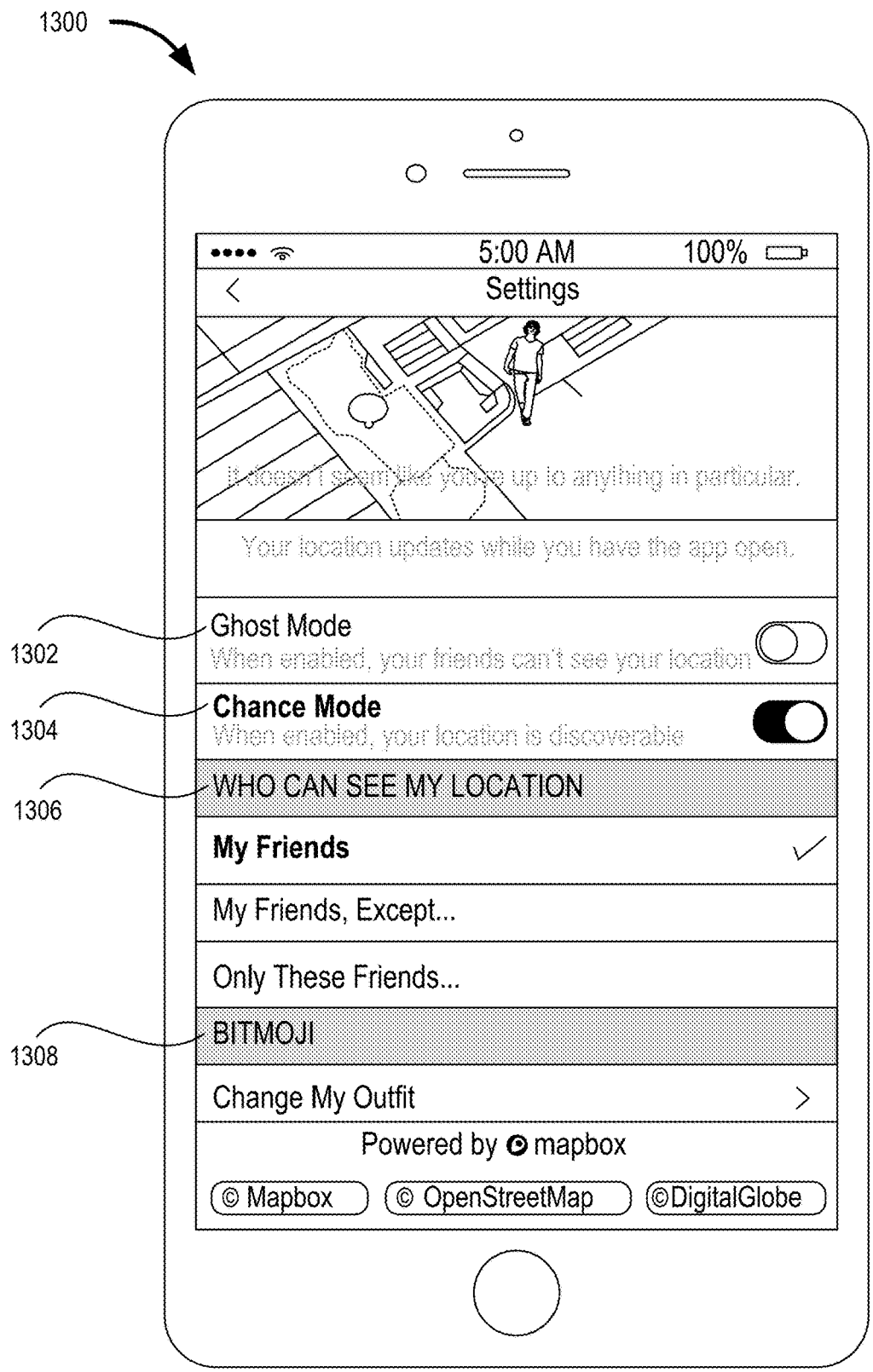

Example embodiments allow a user to view and change settings for chance mode. FIG. 13 illustrates a display 1300 for viewing and changing settings for chance mode. For example, the settings include a ghost mode setting 1302 that hides the user from being visible in a map on other computing devices and a chance mode setting 1304 to enable or disable chance mode. The settings further include a setting 1306 for specifying which users are able to see the user in a map (e.g., all friends, friends with certain exceptions, only certain friends, etc.). The settings further include a bitmoji setting 1308 to update or edit a bitmoji representing the user. For example, the user can change the outfit on the bitmoji. This may be particularly useful when meeting a second user in chance mode to match the outfit on the user bitmoji to the current outfit the user is wearing so the second user can easily identify the user in real life.

Example embodiments allow a user to meet other users in a chance mode enabled area (e.g., in a chance mode geofence). In this way, when a user enters a chance mode enabled area, the user can manually turn on chance mode or chance mode may be automatically activated, based on user preferences. For example, a user can specify that he wants to activate chance mode for a specified location or event (e.g., a one-time event at a bar) or activate chance mode based on location categories. For example, a user can specify that he wants to activate chance mode whenever he enters a bar or a restaurant. Other location categories may include a park, a festival, a farmers' market, a concert, a dog park, a playground, a library, a college quad, a gathering area, a coffee shop, and so forth.

In other example embodiments, a user can specify that he wants to activate chance mode based on one or more interest groups, for example, a moms' group, a dog owners' group, a college student group, a group based on an interest in music, or another interest group. For example, if a user activated chance mode for a moms' group, the chance mode would be automatically activated when the user enters a playground with other moms, a kids' event, a school, and the like. In another example, if a user activated chance mode for a dog owners' group, the chance mode would be automatically activated when the user enters a dog park, a veterinarian's office, and the like. In another example, for a college student group, the chance mode would be automatically activated when the user enters a college library or quad, or another location or gathering area on a college campus.

Example embodiments also allow a user to meet other users at an employee or professional gathering or networking event, in addition to a purely social event, location, or gathering. For example, a user can activate chance mode for an employee campus lunch, a professional networking event, and the like. In these (and other) scenarios, the actions for initiating contact with a second user can be customized. For example, a wink can be replaced with a networking symbol or other appropriate action.

Figure 14:
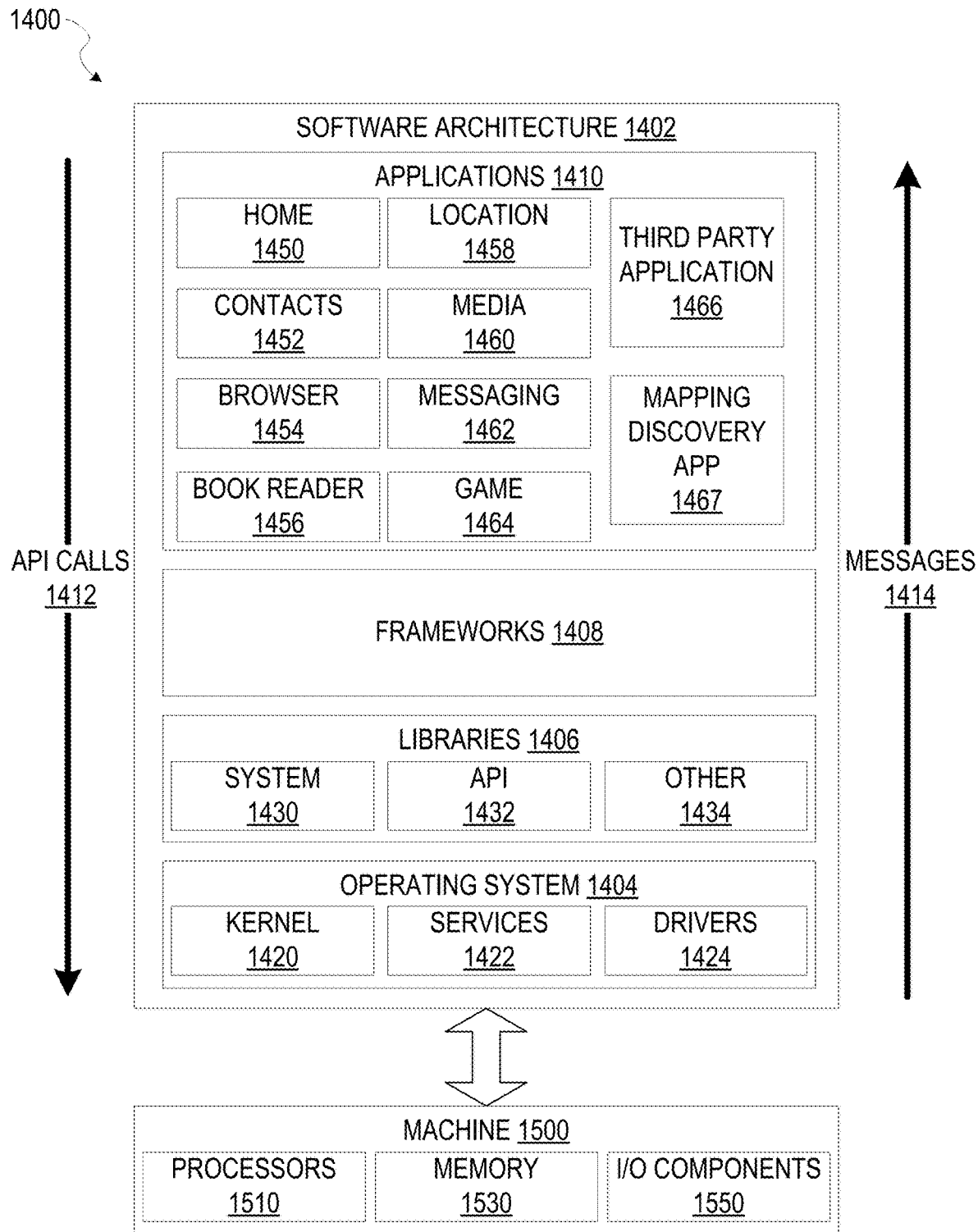
FIG. 14 is a block diagram illustrating an example of a software architecture that may be installed on a machine, according to some example embodiments.

FIG. 14 is a block diagram 1400 illustrating a software architecture 1402, which can be installed on any one or more of the devices described above. For example, in various embodiments, client devices 110, server systems 102, 112, 116, 118, 122, and 124 may be implemented using some or all of the elements of the software architecture 1402. FIG. 14 is merely a non-limiting example of a software architecture, and it will be appreciated that many other architectures can be implemented to facilitate the functionality described herein. In various embodiments, the software architecture 1402 is implemented by hardware such as a machine 1500 of FIG. 15 that includes processors 1510, memory 1530, and I/O components 1550. In this example, the software architecture 1402 can be conceptualized as a stack of layers where each layer may provide a particular functionality. For example, the software architecture 1402 includes layers such as an operating system 1404, libraries 1406, frameworks 1408, and applications 1410. Operationally, the applications 1410 invoke API calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third-party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third-party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1466 can invoke the API calls 1412 provided by the operating system 1404 to facilitate functionality described herein.

Some embodiments may particularly include a mapping discovery application 1467. In certain embodiments, this may be a standalone application that operates to manage communications with a server system, such as third-party servers or the server system 108. In other embodiments, this functionality may be integrated with another application (e.g., the messaging application 1462). The mapping discovery application 1467 may request and display various data related to messaging, media content, media collections, media overlays, mapping, chance mode, and so forth, and may provide the capability for a user to input data related to the system via a touch interface, via a keyboard, or using a camera device of the machine 1500, communication with a server system via the I/O components 1550, and receipt and storage of object data in the memory 1530. Presentation of information and user inputs associated with the information may be managed by the mapping discovery application 1467 using different frameworks 1408, library 1406 elements, or operating system 1404 elements operating on the machine 1500.

Figure 15:
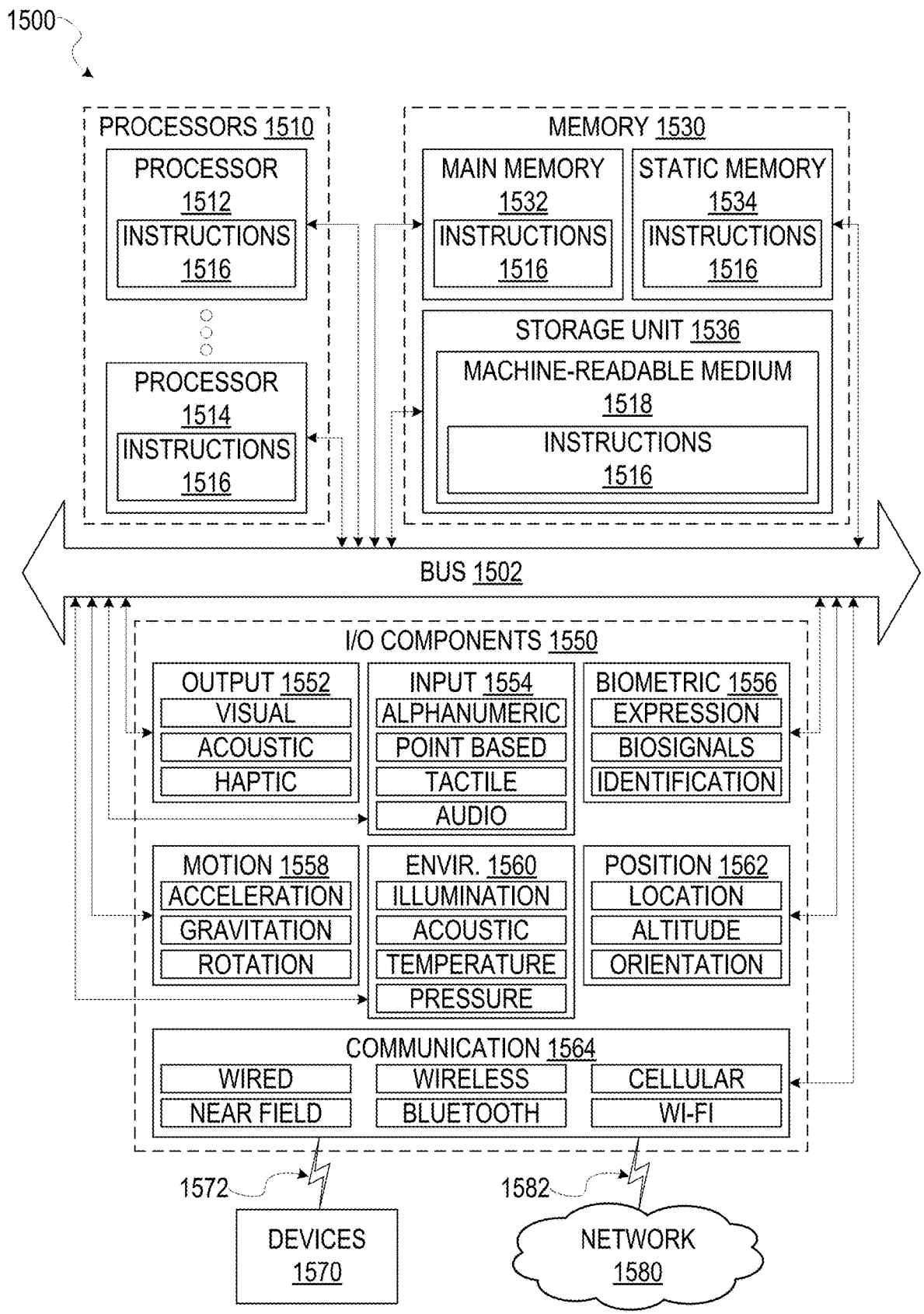
FIG. 15 illustrates a diagrammatic representation of a machine, in the form of a computer system, within which a set of instructions may be executed for causing the machine to perform any one or more of the methodologies discussed herein, according to an example embodiment.

FIG. 15 is a block diagram illustrating components of a machine 1500, according to some embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. In alternative embodiments, the machine 1500 operates as a standalone device or can be coupled (e.g., networked) to other machines. In a networked deployment, the machine 1500 may operate in the capacity of a server machine 102, 112, 116, 118, 122, 124, and the like, or a client device 110 in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1512 and a processor 1514 that may execute the instructions 1516. The term "processor" is intended to include multi-core processors 1510 that may comprise two or more independent processors 1512, 1514 (also referred to as "cores") that can execute instructions 1516 contemporaneously. Although FIG. 15 shows multiple processors 1510, the machine 1500 may include a single processor 1510 with a single core, a single processor 1510 with multiple cores (e.g., a multi-core processor 1510), multiple processors 1512, 1514 with a single core, multiple processors 1512, 1514 with multiple cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1518 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1518.

As used herein, the term "memory" refers to a machine-readable medium 1518 able to store data temporarily or permanently and may be taken to include, but not be limited to, random-access memory (RAM), read-only memory (ROM), buffer memory, flash memory, and cache memory. While the machine-readable medium 1518 is shown, in an example embodiment, to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions 1516, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1570 may be another machine 1500 or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1518 is non-transitory (in other words, not having any transitory signals) in that it does not embody a propagating signal. However, labeling the machine-readable medium 1518 "non-transitory" should not be construed to mean that the medium is incapable of movement; the machine-readable medium 1518 should be considered as being transportable from one physical location to another. Additionally, since the machine-readable medium 1518 is tangible, the machine-readable medium 1518 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    determining, by a server system, that a first computing device is located within a predetermined geofence;
    determining a plurality of computing devices that are located within the predetermined geofence;
    causing display on a map of the first computing device, by the server system, of a graphical indicium for each user associated with a respective computing device in at least a subset of the plurality of computing devices that are located within the predetermined geofence;
    establishing a temporary two-way communication between the first computing device and a second computing device of the subset of plurality of computing devices that are located within the predetermined geofence on the map;
    starting a timer once the two-way communication is established; and
    deleting messages exchanged between the first computing device and the second computing device once the timer reaches the end of the limited time period, causing the messages to no longer display on the first computing device and the second computing device.

2. The method of claim 1, further comprising:
    receiving, from the first computing device, an action to block a third user associated with a third computing device in the subset of the plurality of computing devices that are located within the predetermined geofence; and
    causing the first computing device to be hidden from the third computing device such that a graphical indicium corresponding to a first user associated with the first computing device is not displayed on a map on the third computing device.

3. The method of claim 1, wherein the predetermined geofence is associated with a location for meeting new users located within the geofence.

4. The method of claim 1, further comprising:
    determining that a first user associated with the first computing device is not opted into a mode for discovering and meeting other people; and causing display on the first computing device of an option to opt into the mode for discovering and meeting other people.

5. The method of claim 4, further comprising:
receiving profile data for the first user, the profile data comprising information related to the mode for discovering and meeting other people.

6. The method of claim 5, further comprising:
generating user information for the first user, the user information comprising a specified number of recent messages generated in a content sharing platform; and
adding the generated user information to profile data for the first user.

7. The method of claim 1, further comprising:
filtering the plurality of computing devices based on criteria contained in profile data for a first user associated with the first computing device to generate the subset of the plurality of computing devices by filtering out users listed in a blacklist or specified by the first user to be blocked to generate the subset of the plurality of computing devices that are located within the predetermined geofence.

8. The method of claim 1, wherein before establishing the temporary two-way communication between the first computing device and the second computing device, the method comprises:
receiving, from the first computing device, an action to send a notification to the second computing device associated with a second user;
sending the notification to the second computing device associated with the second user; and
based on receiving, from the second computing device, a response to the notification,
establishing the temporary two-way communication between the first computing device and the second computing device.

9. The method of claim 1, wherein the graphical indicium is a bitmoji.

10. The method of claim 1, further comprising:
receiving, from the first computing device, an action to send a notification to a third computing device in the subset of the plurality of computing devices that are located within the predetermined geofence;
sending the notification to the third computing device; and
based on not receiving a response to the notification from the third computing device, not establishing a temporary two-way communication between the first computing device and the third computing device.

11. The method of claim 1, wherein the graphical indicium is displayed with a second graphical indicium if a user is opted into a mode for discovering and meeting other users.

12. The method of claim 1, wherein determining the plurality of computing devices that are located within the predetermined geofence is based on determining that the plurality of computing devices are located withing the predetermined geofence withing a specified time period set for the predetermined geofence.

13. A server system comprising:
a memory that stores instructions; and
one or more processors configured by the instructions to perform operations comprising:
determining that a first computing device is located within a predetermined geofence;
determining a plurality of computing devices that are located within the predetermined geofence;
causing display on a map of the first computing device of a graphical indicium for each user associated with a respective computing device in at least a subset of the plurality of computing devices that are located within the predetermined geofence;
establishing a temporary two-way communication between the first computing device and a second computing device of the subset of plurality of computing devices that are located within the predetermined geofence on the map;
starting a timer once the two-way communication is established; and
deleting messages exchanged between the first computing device and the second computing device once the timer reaches the end of the limited time period, causing the messages to no longer display on the first computing device and the second computing device.

14. The server system of claim 13, the operations further comprising:
determining that a first user associated with the first computing device is not opted into a mode for discovering and meeting other people;
causing display on the first computing device of an option to opt into the mode for discovering and meeting other people;
receiving profile data for the first user, the profile data comprising information related to the mode for discovering and meeting other people;
generating user information for the first user, the user information comprising a specified number of recent messages generated in a content sharing platform; and
adding the generated user information to profile data for the first user.

15. The server system of claim 13, the operations further comprising:
filtering the plurality of computing devices based on criteria contained in profile data for a first user associated with the first computing device to generate the subset of the plurality of computing devices by filtering out users listed in a blacklist or specified by the first user to be blocked to generate the subset of the plurality of computing devices that are located within the predetermined geofence.

16. The server system of claim 13, wherein before establishing the temporary two-way communication between the first computing device and the second computing device, the operations comprises:
receiving, from the first computing device, an action to send a notification to the second computing device associated with a second user;
sending the notification to the second computing device associated with the second user; and
based on receiving, from the second computing device, a response to the notification,
establishing the temporary two-way communication between the first computing device and the second computing device.

17. The server system of claim 13, the operations further comprising:
receiving, from the first computing device, an action to send a notification to a third computing device in the subset of the plurality of computing devices that are located within the predetermined geofence;
sending the notification to the third computing device; and
based on not receiving a response to the notification from the third computing device, not establishing a temporary two-way communication between the first computing device and the third computing device.

18. The server system of claim 13, wherein the graphical indicium is displayed with a second graphical indicium if a user is opted into a mode for discovering and meeting other users.

19. The server system of claim 13, wherein determining the plurality of computing devices that are located within the predetermined geofence is based on determining that the plurality of computing devices are located withing the predetermined geofence withing a specified time period set for the predetermined geofence.

20. A non-transitory computer-readable medium comprising instructions stored thereon that are executable by at least one processor to cause a computing device to perform operations comprising:

- determining that a first computing device is located within a predetermined geofence;
- determining a plurality of computing devices that are located within the predetermined geofence;
- causing display on a map of the first computing device of a graphical indicium for each user associated with a respective computing device in at least a subset of the plurality of computing devices that are located within the predetermined geofence;
- establishing a temporary two-way communication between the first computing device and a second computing device of the subset of plurality of computing devices that are located within the predetermined geofence on the map;
- starting a timer once the two-way communication is established; and
- deleting messages exchanged between the first computing device and the second computing device once the timer reaches the end of the limited time period, causing the messages to no longer display on the first computing device and the second computing device.

* * * * *